(12) United States Patent
Hiroi et al.

(10) Patent No.: US 11,719,273 B2
(45) Date of Patent: Aug. 8, 2023

(54) COATING FILM PEELING NUT

(71) Applicant: AOYAMA SEISAKUSHO CO., LTD., Niwa-Gun (JP)

(72) Inventors: Yuichi Hiroi, Niwa-Gun (JP); Akihiro Furukawa, Niwa-Gun (JP); Yukinori Fujimoto, Niwa-Gun (JP)

(73) Assignee: AOYAMA SEISAKUSHO CO., LTD., Niwa-Gun (JP)

( * ) Notice: Subject to any disclaimer, the term of this patent is extended or adjusted under 35 U.S.C. 154(b) by 412 days.

(21) Appl. No.: 17/085,199

(22) Filed: Oct. 30, 2020

(65) Prior Publication Data

US 2021/0048057 A1  Feb. 18, 2021

Related U.S. Application Data

(63) Continuation of application No. PCT/JP2019/022288, filed on Jun. 5, 2019.

(30) Foreign Application Priority Data

Jul. 19, 2018 (JP) ................................ 2018-135675

(51) Int. Cl.
*F16B 33/02* (2006.01)
*F16B 37/00* (2006.01)

(52) U.S. Cl.
CPC .............. *F16B 33/02* (2013.01); *F16B 37/00* (2013.01)

(58) Field of Classification Search
CPC .......... F16B 23/00; F16B 33/02; F16B 37/00; F16B 37/0842; F16B 37/0857

USPC .......................................... 411/427, 436, 437
See application file for complete search history.

(56) References Cited

U.S. PATENT DOCUMENTS

| 1,116,241 | A | * | 11/1914 | Carlson | F16B 37/02 16/108 |
| 3,933,074 | A | * | 1/1976 | Witte | F16B 39/284 411/917 |
| 4,347,636 | A | * | 9/1982 | Capuano | B21K 1/56 470/25 |
| 5,139,380 | A | * | 8/1992 | Reynolds | F16B 37/02 411/937.1 |

(Continued)

FOREIGN PATENT DOCUMENTS

| DE | 30 01 350 A1 | 7/1981 |
| DE | 30 19 084 A1 | 12/1981 |

(Continued)

OTHER PUBLICATIONS

Chinese Office Action (Application No. 201980042898.X) dated Jul. 27, 2021.

(Continued)

*Primary Examiner* — Roberta S Delisle
(74) *Attorney, Agent, or Firm* — Burr Patent Law, PLLC

(57) ABSTRACT

The coating film peeling nut of the present invention has a notch 13 formed in an inner surface of a nut main body 10 on which a female screw 12 is formed, the notch 13 extending in a direction different from that of a lead angle of the female screw 12. The notch 13 is formed helically, and a winding direction thereof is the same as that of the female screw 12. A pitch of the notch 13 is 2 to 10 times a pitch of the female screw 12, and a depth of the notch 13 is 20 to 80% of a thread height of the female screw 12.

4 Claims, 2 Drawing Sheets

(56) References Cited

U.S. PATENT DOCUMENTS

| | | | | |
|---|---|---|---|---|
| 6,406,238 | B2* | 6/2002 | Takeuchi | ................. H01R 4/64 411/188 |
| 2012/0014764 | A1* | 1/2012 | Davidson | .............. F16B 37/002 411/437 |
| 2015/0308483 | A1 | 10/2015 | Suzuki et al. | |
| 2017/0219001 | A1 | 8/2017 | Hiroi et al. | |

FOREIGN PATENT DOCUMENTS

| | | |
|---|---|---|
| DE | 195 05 227 | 7/1996 |
| EP | 2 924 303 A1 | 9/2015 |
| JP | S57-049914 U | 3/1982 |
| JP | S59-079613 U | 5/1984 |
| JP | H05-047522 U | 6/1993 |
| JP | 2014-101990 A1 | 6/2014 |

OTHER PUBLICATIONS

International Search Report and Written Opinion (Application No. PCT/JP2019/022288) dated Sep. 10, 2019.
Japanese Office Action (Application No. 2018-135675) dated May 10, 2022 (with English translation).
Japanese Office Action (with English translation) dated Jul. 26, 2022 (Application No. 2018-135675).

* cited by examiner

[Fig. 1]
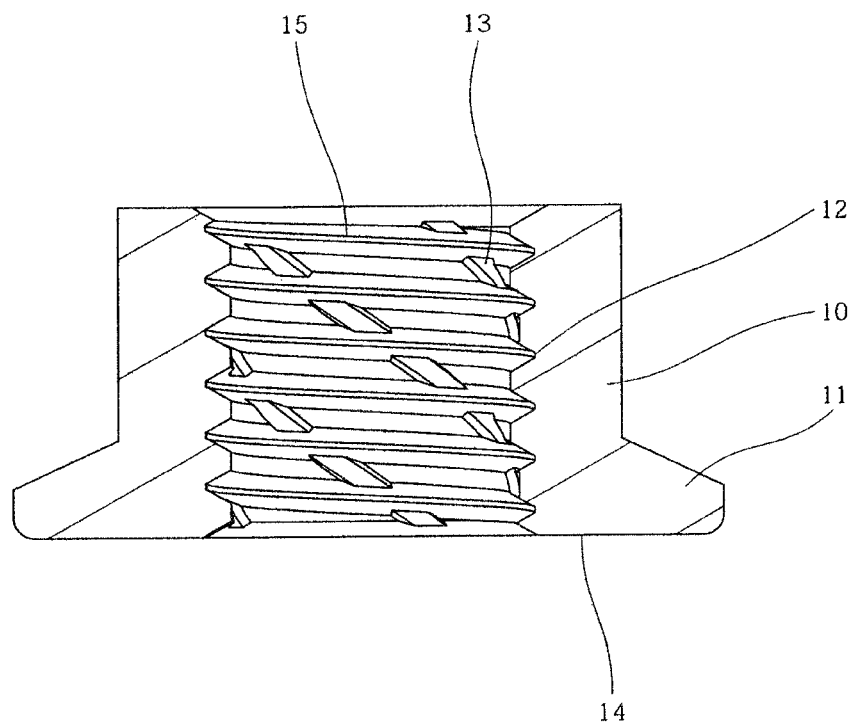
[Fig. 2]
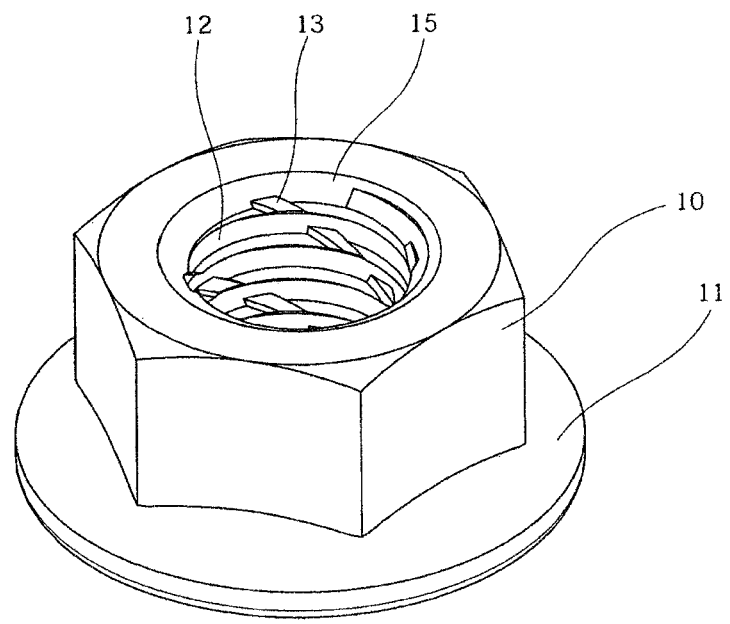

[Fig. 3]
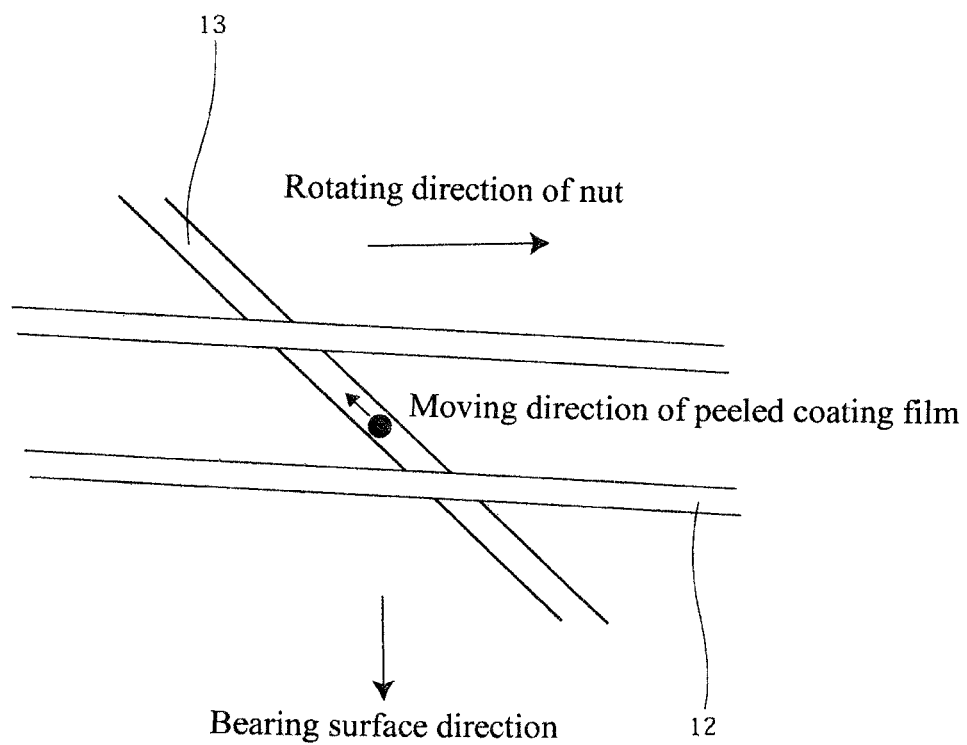

COATING FILM PEELING NUT

TECHNICAL FIELD

The present invention relates to a coating film peeling nut which can be tightened while peeling a coating film adhering to a male screw component, and particularly to a coating film peeling nut suitable for use, for example, in undercarriages of automobiles.

BACKGROUND ART

In order to improve the rust prevention performance of automobiles, the coating of automobile components is thickened, and, at the same time, the coating of male screw components such as bolts welded to the automobile components is similarly thickened. However, even if it is attempted to screw a nut onto a male screw component having a thick coating film adhering thereto, the coating film serves as a resistance so that the nut cannot be properly tightened.

Therefore, conventionally, a masking tape is applied to a male screw component before coating to prevent adhesion of a coating film, or a nut with a cap is attached to a male screw component to prevent adhesion of a coating film. In the case of electrode-position coating, an insulating film is formed in advance on a threaded portion of a male screw component. However, these methods require an operation of removing a masking tape or the like after the coating has been performed or peeling off the coating together with the insulating film, which lowers the productivity.

Moreover, in view of the fastening structure, a male screw component needs to be fixed to a mating material to be coated by welding or the like. In such a structure, it is often difficult to weld the male screw component after coating. This is because welding cannot be performed after coating since the mating material is in an insulated state upon coating. Moreover, this is because, in many cases, no workspace exists for welding the male screw component after completion of a component. For the reasons, a coating film often adheres to the male screw component.

In order to solve such a problem, Patent Literature 1 proposes a nut in which a notch extending in the axial direction is formed in a female screw surface. This nut has a nut main body with a coating film peeling function. This nut can peel off a coating film, but involves another problem that, when the nut is tightened from the top, the peeled coating film falls onto the bearing surface side of the nut, so that complete fastening cannot be achieved due to the coating film.

CITATION LIST

Patent Literature

PTL 1: JP 2014-101990 A

SUMMARY OF INVENTION

Technical Problem

Therefore, an object of the present invention is to solve the above-mentioned conventional problems and to provide a coating film peeling nut capable of achieving complete fastening while peeling off a coating film adhering to a male screw component.

Solution to Problem

A coating film peeling nut of the present invention made to solve the above problems includes a notch formed in an inner surface of a nut main body on which a female screw is formed, the notch extending in a direction different from that of a lead angle of the female screw.

In a preferred embodiment, the notch is formed helically, and a winding direction thereof is the same as that of the female screw. In the preferred embodiment, a pitch of the helically formed notch is 2 to 10 times a pitch of the female screw, and a depth of the notch is 20 to 80% of a thread height of the female screw. Furthermore, a lead angle of the notch is larger than the lead angle of the female screw. A lower end of the notch reaches a bearing surface of the nut main body, and an upper end thereof reaches an upper end of the female screw.

Advantageous Effects of Invention

The coating film peeling nut of the present invention is configured so that a notch extending in a direction different from that of a lead angle of a female screw is formed in an inner surface of a nut main body on which the female screw is formed. Therefore, the coating film peeled off by the notch when the nut is screwed onto a male screw component can be discharged to a head side opposite to a bearing surface of the nut main body through a space formed by the notch. Therefore, it is possible to solve the problem that the peeled coating film falls onto the bearing surface to inhibit complete fastening.

BRIEF DESCRIPTION OF DRAWINGS

FIG. 1 is a central longitudinal cross-sectional view of a coating film peeling nut of an embodiment.

FIG. 2 is a perspective view of the coating film peeling nut of the embodiment.

FIG. 3 is an explanatory view of discharge of a coating film.

DESCRIPTION OF EMBODIMENTS

An embodiment of the present invention will be described below.

FIG. 1 is a central longitudinal cross-sectional view of a coating film peeling nut of an embodiment, and FIG. 2 is a perspective view thereof. Male screw components are not shown, but are ordinary bolts, welding bolts, and the like.

In these figures, reference sign 10 represents a nut main body and, in the present embodiment, a flange nut in which a flange 11 is integrally formed on the bearing surface side. However, the form of the nut main body 10 is not particularly limited. Reference sign 12 represents a female screw formed on an inner surface of the nut main body 10 and, in the present embodiment, a right-threaded screw. The cross-sectional shape of the female screw 12 is a general trapezoidal shape.

A notch 13 extending in a direction different from that of a lead angle of the female screw 12 is formed in an inner surface of the nut main body 10. The notch 13 has a lead angle larger than the lead angle of the female screw 12, and is formed to obliquely cross the thread of the female screw 12. Although a plurality of notches 13 are present in the present embodiment, a single notch 13 may also be adopted. The cross-sectional shape of the notches 13 is trapezoidal in the present embodiment, but is not limited thereto, and may be a triangular screw shape. In any case, it is preferable that the notches 13 enhance the peelability of the coating film as a structure obtained by notching the female screw 12 sharply.

As shown in FIGS. 1 and 2, the notches 13 are formed over the entire height of the inner surface of the nut main body 10. Specifically, the lower end of the notches 13 reaches a bearing surface 14, and the upper end of the notches 13 reaches an upper incomplete threaded portion 15 at the upper end of the female screw 12. This makes it possible to eliminate the coating film over the entire height of the nut main body 10.

Further, the notches 13 are formed in a helical stripe, as a whole, so as to be continuous across valleys of the female screw 12. The winding direction of this helix is the same as that of the female screw 12, i.e., the notches 13 are right-threaded like the female screw 12 in the present embodiment. However, when the female screw 12 is left-threaded, the notches 13 are also left-threaded.

The pitch of the helix of the notches 13 has no meaning if it is the same as the pitch of the female screw 12, and is preferably 2 to 10 times the pitch of the female screw 12. If the pitch of the notches 13 is smaller than this range, the angle with respect to the thread of the female screw 12 becomes smaller, so that the effect of moving the peeled coating film decreases. Conversely, if it exceeds 10 times, the angle with respect to the thread of the female screw 12 becomes too large, and the number of the notches 13 decreases. Therefore, the effect of moving the peeled coating film also decreases.

The depth of the notches 13 is preferably 20 to 80% of the thread height of the female screw 12. This is because, if the depth of the notches 13 is too shallow, a space for the peeled coating film to move cannot be secured, and conversely, if it is too deep, the thread of the female screw 12 will be cut off by the notches 13, so that the tightening properties and fastening strength of the nut main body 10 will be reduced.

The thus-configured coating film peeling nut of the present invention can be screwed onto a normal male screw component in the same manner as a normal nut. Further, when screwed onto a male screw component to which a coating film adheres, the coating film is peeled off by edges of the notches 13 formed to diagonally cross the thread of the female screw 12.

The peeled coating film enters the inside of the notches 13 as shown in FIG. 3, is pushed up along the slope of the helically formed notch 13 by the rotation of the nut main body 10, travels in the opposite direction to the bearing surface 14 of the nut main body 10, and is discharged from the upper end of the nut main body. For this reason, the coating film peeled off does not fall between the bearing surface 14 of the nut main body 10 and the mating member as in the prior art, so that complete fastening can be achieved. Further, since the nut can be fastened while peeling off the coating film, the resistance due to the coating film decreases, so that normal tightening can be achieved.

Therefore, when the coating film peeling nut of the present invention is used, it is not necessary to mask a male screw component so that no coating film would adhere to the male screw component as in the prior art or to peel off the coating film adhering to the male screw component in advance. Hence, the productivity can be improved.

In addition, in order to enhance the coating film peeling function, it is preferable to impart a sharp edge to the respective notches 13. For this reason, it is preferable to form the notches 13 by a method of using a die similarly to the cutting of the female screw 12.

REFERENCE SIGNS LIST

10 Nut main body
11 Flange
12 Female screw
13 Notch
14 Bearing surface
15 Upper incomplete threaded portion

The invention claimed is:

1. A coating film peeling nut comprising a notch formed in an inner surface of a nut main body on which a female screw is formed, the notch extending in a direction different from that of a lead angle of the female screw, wherein the notch is formed helically, and a winding direction thereof is the same as that of the female screw.

2. The coating film peeling nut according to claim 1, wherein a pitch of the helically formed notch is 2 to 10 times a pitch of the female screw, and a depth of the notch is 20 to 80% of a thread height of the female screw.

3. The coating film peeling nut according to claim 1, wherein a lead angle of the notch is larger than the lead angle of the female screw.

4. The coating film peeling nut according to claim 1, wherein a lower end of the notch reaches a bearing surface of the nut main body, and an upper end thereof reaches an upper end of the female screw.

* * * * *